(12) United States Patent
Harris

(10) Patent No.: US 10,641,153 B1
(45) Date of Patent: May 5, 2020

(54) EXHAUST AFTER-TREATMENT SYSTEM HAVING AN OXIDATION COMPONENT BYPASS FOR LOW TEMPERATURE SCR

(71) Applicant: Tenneco Automotive Operating Company Inc., Lake Forest, IL (US)

(72) Inventor: Thomas M. Harris, Jackson, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 16/199,421

(22) Filed: Nov. 26, 2018

(51) Int. Cl.
*F01N 3/20* (2006.01)
*F01N 3/035* (2006.01)
*B01D 53/94* (2006.01)
*F01N 3/10* (2006.01)

(52) U.S. Cl.
CPC ............ *F01N 3/208* (2013.01); *F01N 3/035* (2013.01); *F01N 3/106* (2013.01); *F01N 3/2053* (2013.01); *F01N 2900/1404* (2013.01)

(58) Field of Classification Search
None
See application file for complete search history.

(56) References Cited

U.S. PATENT DOCUMENTS

| | | | |
|---|---|---|---|
| 8,506,893 B2 | 8/2013 | Gandhi et al. | |
| 8,828,342 B1 | 9/2014 | Tyo et al. | |
| 9,188,036 B2 | 11/2015 | Degen et al. | |
| 2008/0120966 A1 | 5/2008 | Sugiyama et al. | |
| 2009/0193794 A1* | 8/2009 | Robel | F02M 26/15 60/295 |
| 2009/0260349 A1* | 10/2009 | Gandhi | B01D 53/9418 60/286 |
| 2011/0058999 A1 | 3/2011 | Ettireddy et al. | |
| 2013/0269327 A1* | 10/2013 | Keppeler | F02M 26/08 60/301 |
| 2015/0128571 A1 | 5/2015 | Bentley | |
| 2015/0337702 A1 | 11/2015 | Ettireddy et al. | |
| 2016/0032803 A1 | 2/2016 | Ettireddy et al. | |

FOREIGN PATENT DOCUMENTS

DE 102017011300 A1 * 5/2018 ............. F01N 3/103

OTHER PUBLICATIONS

Woog et al. DE-102017011300-A1-translated document (Year: 2018).*

* cited by examiner

*Primary Examiner* — Walter D. Griffin
*Assistant Examiner* — Jelitza M Perez
(74) *Attorney, Agent, or Firm* — Harness, Dickey & Pierce, P.L.C.

(57) ABSTRACT

An exhaust after-treatment system that is configured to treat an exhaust produced by an engine, and includes a bypass passage including an inlet for receiving an amount of the exhaust from an exhaust passage. A first exhaust treatment component is located within the bypass passage, and a valve is located proximate the bypass passage that is configured to control the amount of the exhaust that enters the inlet of the bypass passage. A second exhaust treatment component is located in the exhaust passage downstream from the inlet of the bypass passage, wherein an outlet of the bypass passage communicates the exhaust treated by the first exhaust treatment component back to the exhaust passage at a location that is downstream from the second exhaust treatment component such that the exhaust treated by the first exhaust treatment component does not interact with the second exhaust treatment component.

13 Claims, 3 Drawing Sheets

EXHAUST AFTER-TREATMENT SYSTEM HAVING AN OXIDATION COMPONENT BYPASS FOR LOW TEMPERATURE SCR

FIELD

The present disclosure relates to an exhaust after-treatment system having an oxidation component bypass for low temperature selective catalytic reduction.

BACKGROUND

This section provides background information related to the present disclosure which is not necessarily prior art.

Diesel engines produce an exhaust that contains nitrogen oxides (NOx), which is a regulated pollutant. NOx can be removed from the exhaust using a process known as selective catalytic reduction (SCR), which utilizes ammonia ($NH_3$) as a chemical reductant to react with the NOx and form nitrogen ($N_2$) on the surface of an SCR catalyst. The ammonia utilized in SCR is derived from a diesel exhaust fluid (DEF), which is a mixture of urea and water that is dosed into the engine exhaust stream. When the engine exhaust has sufficient enthalpy (temperature and flow rate), the water of the DEF is readily evaporated and the urea is decomposed to ammonia as the DEF is dosed into the engine exhaust stream. If the engine exhaust does not have sufficient enthalpy, however, the water is not as readily evaporated and the urea does not decompose to a sufficient extent, which can lead to the development of solid deposits within the exhaust conduit. This typically occurs when the ambient environment is cold, or when the engine has not been operated for an extended period of time. In either case, the exhaust after-treatment system has not had a sufficient amount of time to be heated by the engine exhaust and develop the sufficient amount of enthalpy to avoid the water not being readily evaporated and the urea not decomposing to a sufficient extent.

One solution that has been proposed for the above-noted problem is to modify an exhaust after-treatment system to include a low-temperature SCR catalyst at a location upstream of a diesel oxidation catalyst (DOC). A low-temperature SCR catalyst is able to achieve NOx conversion to nitrogen at lower temperatures (i.e., at cold start, or in cold weather) sooner than a SCR catalyst component located downstream of the DOC due to the low-temperature SCR catalyst component receiving nearly all of the exhaust enthalpy that exits the engine. Unfortunately, there are several potential disadvantages or trade-offs associated with the use of a low-temperature SCR component upstream of the DOC.

Firstly, because the low-temperature SCR component must also receive ammonia to convert the NOx to nitrogen, the after-treatment system may require a first DEF dosing module or injector that is specifically designated for dosing DEF for use by the low-temperature SCR component, and a second DEF dosing module or injector that is specifically designated for dosing DEF for use by the primary SCR component located downstream of the DOC. The additional dosing module or injector increases the complexity and cost of the after-treatment system.

Secondly, an ammonia slip catalyst (ASC) must be located between the low-temperature SCR component and the DOC to prevent or at least substantially minimize ammonia that slips through the low-temperature SCR component from reaching the DOC and being oxidized to NOx or $N_2O$.

Thirdly, in systems where the low-temperature SCR component is designed to accept an entirety of the exhaust flow from the engine, it is likely that the low-temperature SCR component will need to be sized too large to be located immediately downstream from the engine (i.e., too large to be close-coupled, or located in the engine compartment). In contrast, such a design would require that the low-temperature SCR component be located further downstream from the engine and immediately upstream from the DOC. As a result, the exhaust may lose a significant amount of enthalpy as it travels through the lengthened section of the exhaust passage, which may negate the benefits of the low-temperature SCR component.

SUMMARY

This section provides a general summary of the disclosure, and is not a comprehensive disclosure of its full scope or all of its features.

According to a first aspect, the present disclosure provides an exhaust after-treatment system that is configured to treat an exhaust produced by an engine. The system includes an exhaust passage for carrying the exhaust produced by the engine; a bypass passage including an inlet for receiving an amount of the exhaust from the exhaust passage; a first exhaust treatment component located within the bypass passage; a valve located proximate the bypass passage that is configured to control the amount of the exhaust that enters the inlet of the bypass passage; and a second exhaust treatment component located in the exhaust passage downstream from the inlet of the bypass passage, wherein an outlet of the bypass passage communicates the exhaust treated by the first exhaust treatment component back to the exhaust passage at a location that is downstream from the second exhaust treatment component such that the exhaust treated by the first exhaust treatment component does not interact with the second exhaust treatment component.

The system according to the first aspect may further include an injector configured to dose an exhaust treatment fluid into the exhaust passage, wherein the injector is only located at a single location that is positioned upstream of the bypass passage.

The system according to the first aspect may also further include a third exhaust treatment component and a fourth exhaust treatment component located downstream from the second exhaust treatment component.

In the system according to the first aspect, the valve may be either passively controlled or actively controlled. If the valve is actively controlled, the system according to the first aspect may further include a controller that is configured to actively control the valve.

In the system according to the first aspect, the outlet of the bypass passage may extend through the center of the second exhaust treatment component.

Alternatively, the outlet may extend in parallel with the exhaust passage, and include a branch that communicates the exhaust treated by the first exhaust treatment component back to the exhaust passage at the location that is downstream from the second exhaust treatment component such that the exhaust treated by the first exhaust treatment component does not interact with the second exhaust treatment component.

The system according to the first aspect may also include a third exhaust treatment component downstream from the second exhaust treatment component, wherein the branch communicates the exhaust treated by the first exhaust treatment component back to the exhaust passage at a location that is downstream from the third exhaust treatment component such that the exhaust treated by the first exhaust treatment component does not interact with either the second exhaust treatment component or the third exhaust treatment component.

The system according to the first aspect may also include a canister in communication with the exhaust passage, wherein the canister houses an entirety of the bypass passage, the first exhaust treatment component located within the bypass passage, the valve located proximate the bypass passage, and the second exhaust treatment component located downstream from the inlet of the bypass passage. With such a configuration, the outlet may extend through a center of the second exhaust treatment component.

According to a second aspect of the present disclosure, there is provided an exhaust after-treatment system that is configured to treat an exhaust produced by an engine that includes an exhaust passage for carrying the exhaust produced by the engine; a bypass passage including an inlet for receiving an amount of the exhaust from the exhaust passage; a first selective catalytic reduction (SCR) component located within the bypass passage; a valve located proximate the bypass passage that is configured to control the amount of the exhaust that enters the inlet of the bypass passage, and always permits an amount of the exhaust to pass through the valve downstream from the inlet of the bypass passage; an injector configured to dose an exhaust treatment fluid into the exhaust passage, the injector only being located at a single location that is positioned upstream of the bypass passage; an oxidation exhaust treatment component located in the exhaust passage downstream from the inlet of the bypass passage; and a second SCR component located downstream from the oxidation exhaust treatment component, wherein an outlet of the bypass passage communicates the exhaust treated by the first SCR component back to the exhaust passage at a location that is downstream from the oxidation exhaust treatment component and upstream from the second SCR component such that the exhaust treated by the first SCR component does not interact with the oxidation exhaust treatment component.

The system according to the second aspect may also include a particulate filter located downstream from the oxidation exhaust treatment component and upstream from the second SCR component, and a slip catalyst located downstream from the second SCR component.

In the system according to the second aspect, there is provided a controller that is configured to actively control the valve.

In the system according to the second aspect, the outlet of the bypass passage may extend through a center of the oxidation exhaust treatment component. Alternatively, the outlet may extend in parallel with the exhaust passage, and include a branch that communicates the exhaust treated by the first SCR component back to the exhaust passage at the location that is downstream from the oxidation exhaust treatment component such that the exhaust treated by the first SCR component does not interact with the oxidation exhaust treatment component.

When the system according to the second aspect also includes a particulate filter downstream from the oxidation exhaust treatment component, the branch may communicate the exhaust treated by the first SCR component back to the exhaust passage at a location that is downstream from the particulate filter such that the exhaust treated by the first SCR component does not interact with either the oxidation exhaust treatment component or the particulate filter.

According to the second aspect, the system may include a canister in communication with the exhaust passage, wherein the canister houses an entirety of the bypass passage, the first SCR component located within the bypass passage, the valve located proximate the bypass passage, and the oxidation exhaust treatment component located downstream from the inlet of the bypass passage. In this configuration, the outlet may extend through a center of the oxidation exhaust treatment component.

According to a third aspect of the present disclosure, there is provided an exhaust after-treatment system that is configured to treat an exhaust produced by an engine that includes an exhaust passage for carrying the exhaust produced by the engine; a canister in communication with the exhaust passage; a bypass passage entirely provided in the canister, the bypass passage including an inlet for receiving an amount of the exhaust that enters the canister from the exhaust passage; a first selective catalytic reduction (SCR) component located within the bypass passage; a valve located in the canister proximate the bypass passage that is configured to control the amount of the exhaust that enters the inlet of the bypass passage, and always permits an amount of the exhaust to pass through the valve downstream from the inlet of the bypass passage; an injector configured to dose an exhaust treatment fluid into the exhaust passage at a single location that is positioned upstream of the canister; an oxidation exhaust treatment component located in the canister downstream from the inlet of the bypass passage; and a second SCR component located in the canister downstream from the oxidation exhaust treatment component, wherein an outlet of the bypass passage communicates the exhaust treated by the first SCR component back to a location in the canister that is downstream from the oxidation exhaust treatment component and upstream from the second SCR component such that the exhaust treated by the first SCR component does not interact with the oxidation exhaust treatment component.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
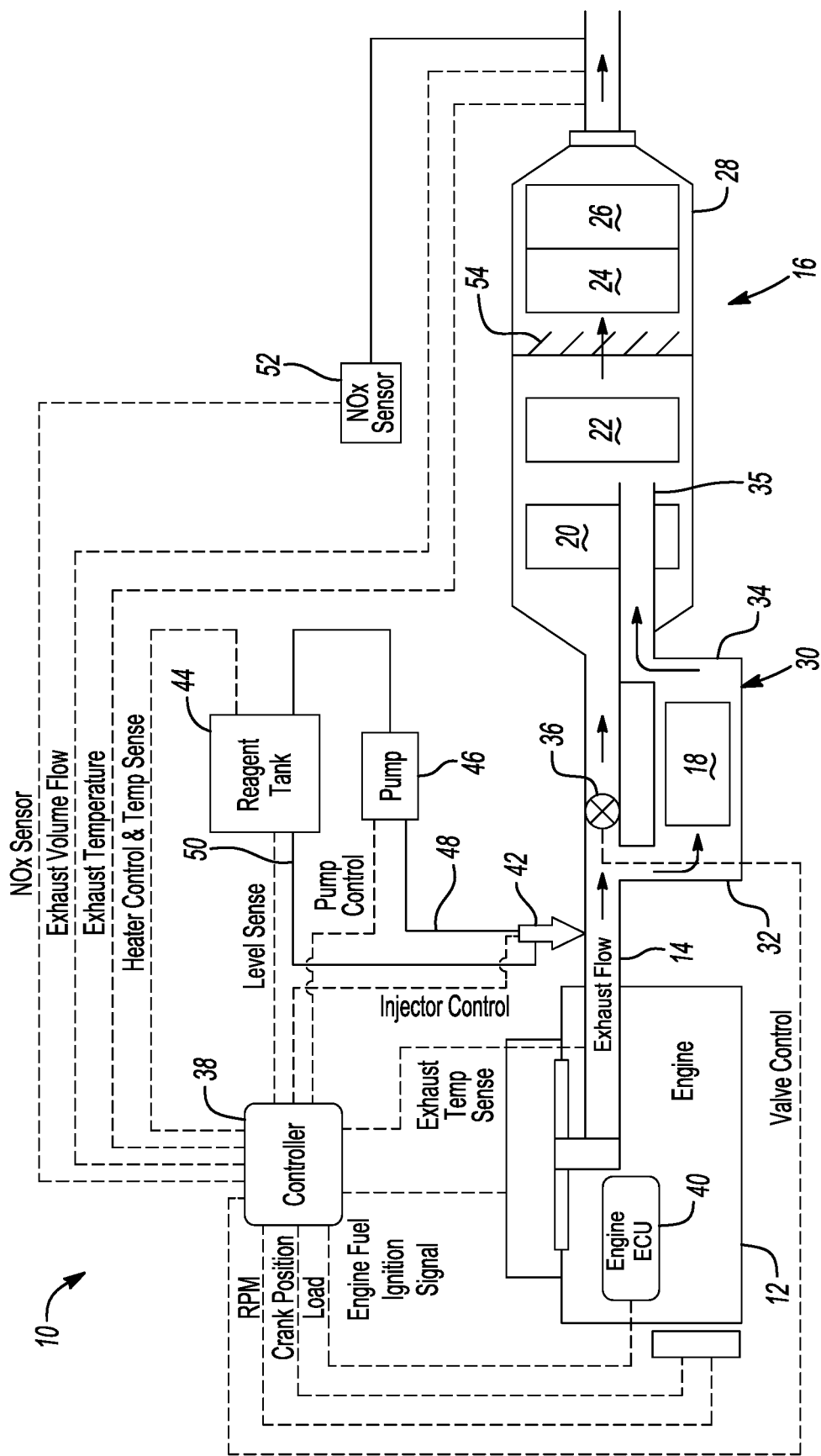
FIG. 1 is a schematic representation of an exhaust system according to a principle of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 schematically illustrates an exhaust system 10 according to a first aspect of the present disclosure. Exhaust system 10 can include at least an engine 12 in communication with a fuel source (not shown) that, once consumed, will produce exhaust gases that are discharged into an exhaust passage 14 having an exhaust after-treatment system 16. Exhaust after-treatment system 16 is located downstream from engine 12, and may include a plurality of exhaust treatment components 18, 20, 22, 24, and 26, which can include catalyst-coated substrates or filters. In the illustrated embodiment, component 18 may be a first or low-temperature SCR component, component 20 may be a DOC component, component 22 may be a diesel particulate filter (DPF) that may be catalyst-coated, component 24 is a second SCR component, and component 26 may be an optional second ASC component. Other known exhaust treatment components (e.g., three-way catalysts, lean NOx traps, etc.) may be used, without limitation. Each of exhaust treatment components 20, 22, 24, and 26 may be enclosed in a single housing or canister 28, if desired. Alternatively, each component 20, 22, 24, and 26 may be separately housed in a respective canister and separated from each other by short sections of exhaust passage 14.

In the illustrated embodiment, exhaust passage 14 includes a bypass passage 30 that includes low-temperature SCR component 18. Bypass passage 30 includes an inlet 32 that is branched off of exhaust passage 14 and receives at least a portion of the engine exhaust therein, and an outlet 34 that feeds the engine exhaust that is treated by low-temperature SCR component 18 back to the exhaust passage 14. To ensure that at least a portion of the engine exhaust is forced to enter bypass passage 30 when desired, a valve 36 may be located in exhaust passage 14 immediately downstream from inlet 32. Valve 36 may be passively controlled by, for example, a spring (not shown) that allows valve to open when the exhaust flow rate in exhaust passage 14 reaches a predetermined threshold, or valve 36 may be actively controlled by an exhaust after-treatment controller 38. Alternatively, valve 36 may be controlled by an electronic control unit (ECU) 40 of the engine 12. When valve 36 is actively controlled, valve 36 may be any type of electrically controlled valve that is known to one skilled in the art. Regardless, it should be understood that valve 36 is designed to always allow a portion of the engine exhaust to pass through valve 36 toward exhaust treatment components 20, 22, 24, and 26. In this manner, the amount of engine exhaust that is allowed to enter bypass passage 30 is reduced.

More particularly, by controlling the amount of engine exhaust that is allowed to enter bypass passage 30, a size of the low-temperature SCR 18 can be made to be smaller (e.g., diameter and length) in comparison to the remaining exhaust treatment components 20, 22, 24, and 26, which allows for low-temperature exhaust treatment component 18 to be packaged in a configuration that runs parallel with exhaust passage 14. Moreover, the smaller size of low-temperature SCR 18 allows for bypass passage 30 to be closely-coupled to engine 12. In this manner, the low-temperature SCR 18 is able to achieve SCR at lower temperatures (i.e., at cold start, or in cold weather) sooner than the SCR catalyst component 24 located downstream due to the low-temperature SCR component 18 receiving nearly all of the exhaust enthalpy that exits the engine 12. Further, by always allowing for a portion of the engine exhaust to pass through valve 36 toward remaining exhaust treatment components 20, 22, 24, and 26, at least a portion of the exhaust enthalpy is able to reach these components to assist in these components reaching a light-off temperature in cold start and cold weather conditions.

Although not required by the present disclosure, exhaust after-treatment system 16 can further include components such as a thermal enhancement device or burner (not shown) to increase a temperature of the exhaust gases passing through exhaust passage 14. Increasing the temperature of the exhaust gas is favorable to achieve light-off of the catalyst in the first SCR component 18 in cold-weather conditions and upon start-up of engine 12, as well as initiate regeneration of the DPF component 22.

To assist in reduction of the emissions produced by engine 12, exhaust after-treatment system 16 can include a dosing module or injector 42 for periodically dosing an exhaust treatment fluid (e.g., DEF) into the exhaust stream. As illustrated in FIG. 1, dosing module 42 can be located upstream of low-temperature SCR component 18 and attached to exhaust passage 14 at inlet 32 of bypass passage 30, and is operable to inject an exhaust treatment fluid into the exhaust stream. In this regard, dosing module 42 is in fluid communication with a reagent tank 44 and a pump 46 by way of inlet line 48 to dose an exhaust treatment fluid such as diesel fuel or DEF into the exhaust passage 14 upstream of low-temperature exhaust treatment component 18. Dosing module 42 can also be in communication with reagent tank 44 via return line 50. Return line 50 allows for any exhaust treatment fluid not dosed into the exhaust stream to be returned to reagent tank 44. Flow of the exhaust treatment fluid through inlet line 48, dosing module 42, and return line 50 also assists in cooling dosing module 42 so that dosing module 42 does not overheat. Although not illustrated in the drawings, dosing module 42 can be configured to include a cooling jacket that passes a coolant around dosing module 42 to cool it.

The amount of exhaust treatment fluid required to effectively treat the exhaust stream may vary with load, engine speed, exhaust gas temperature, exhaust gas flow, engine fuel injection timing, desired NOx reduction, barometric pressure, relative humidity, EGR rate and engine coolant temperature. A NOx sensor or meter 52 may be positioned downstream from exhaust treatment components 22, 24, 26, and 28. NOx sensor 52 is operable to output a signal indicative of the exhaust NOx content to controller 38 or ECU 40. All or some of the engine operating parameters may be supplied from engine control unit 40 via the engine/vehicle databus to controller 38. The controller 38 could also be included as part of the ECU 40. Exhaust gas temperature, exhaust gas flow and exhaust back pressure and other vehicle operating parameters may be measured by respective sensors, as indicated in FIG. 1.

The amount of exhaust treatment fluid required to effectively treat the exhaust stream can also be dependent on the size of the engine 12. In this regard, large-scale diesel engines used in locomotives, marine applications, and stationary applications can have exhaust flow rates that exceed the capacity of a single dosing module 42. Accordingly, although only a single dosing module 42 is illustrated for dosing exhaust treatment fluid into the exhaust passage 14, it should be understood that multiple dosing modules 42 for reagent injection are contemplated by the present disclosure so long as the multiple dosing modules 42 are located upstream of low-temperature SCR component 18 at inlet 32 of bypass passage 30. As noted above, a second injector 42 attached to canister 28 for second SCR component 24 is not required, which reduces system 16 complexity and cost.

In accordance with the present disclosure, the engine exhaust that enters bypass passage 30 and is treated by low-temperature SCR component 18 is not permitted to remix with the engine exhaust in exhaust passage 14 downstream from valve 36 and upstream from the DOC component 20. In contrast, outlet 34 of bypass passage 30 enters canister 28 and includes a length 35 that extends co-axially with exhaust passage 14 and canister 28, and bypasses DOC component 20 by passing through a center of DOC component 20. As illustrated, length 35 is greater than a length of DOC component 20 such that outlet 34 extends through an entirety of DOC component 20, and extends outward from DOC component 20. Alternatively, although not illustrated, it should be understood that outlet 34 may be designed to bypass each of DOC component 20 and DPF component 22 by passing through a center of each of these components. Regardless, it should be understood that the engine exhaust that enters bypass passage 30 and is treated by low-temperature SCR component 18 is not permitted to remix with the engine exhaust until it reaches a location downstream from at least DOC component 20. Because DOC component 20 is bypassed, exhaust after-treatment system 16 only requires injector(s) 42 at a single location (i.e., upstream of low-temperature SCR component 18), and does not require injectors 42 downstream from DOC component 20 and upstream from second SCR component 24. Moreover, this configuration does not require an ASC component to be coupled with low-temperature SCR component 18, which enables low-temperature SCR component 18 to be enlarged while still maintaining a package size that is consistent with the close-coupled location of bypass passage 30. Further, the NOx that has been treated by low-temperature SCR component 18 to form $N_2$ cannot be re-oxidized by DOC component 20.

In light of the exhaust treatment fluid being dosed into the exhaust stream at a location upstream of low-temperature SCR component 18, a mixing device 54 may be provided in canister 28 at location downstream of length 35 and upstream of second SCR component 24. Mixing device 54 assists in redistributing the ammonia before it enters and is treated by second SCR component 24. Any mixing device 54 known to one skilled in the art may be used.

Figure 2:
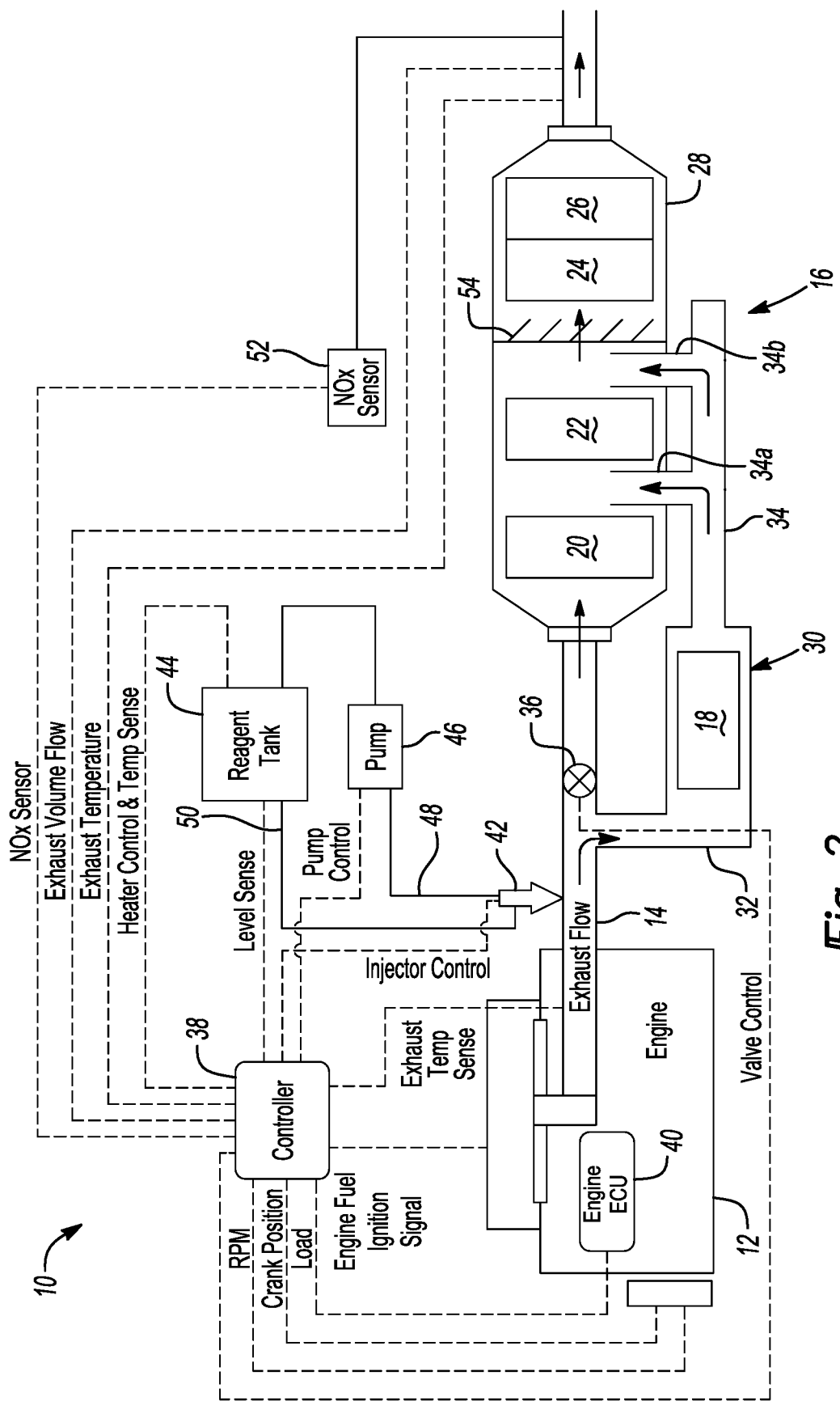
FIG. 2 is a schematic representation of an exhaust system according to a principle of the present disclosure.

Now referring to FIG. 2, an exhaust after-treatment system 16 according to a second aspect of the present disclosure is illustrated. The configuration illustrated in FIG. 2 is similar to the configuration illustrated in FIG. 1, but differs in that bypass outlet 34 does not pass through a center of DOC component 20, but rather runs parallel with exhaust passage 14 to a location downstream from DOC component 20, or to a location downstream from each of DOC component 20 and DPF component 22. In this regard, bypass outlet 34 has a length that is selected to pass DOC component 20 and then extend toward and into canister 28 at a branch 34a that routes the exhaust to canister 28 at a location downstream from DOC component 20, or extend toward and into canister 28 at a branch 34b that routes the exhaust to canister 28 at location downstream from each of DOC component 20 and DPF component 22. Moreover, while mixing device 54 is located between DPF component 22 and second SCR component 24, it should be understood that mixing device 54 may be located between DOC component 20 and DPF component 22 without departing from the scope of the present disclosure.

Regardless whether system 16 includes branch 34a or branch 34b, it should be understood that the engine exhaust that enters bypass passage 30 and is treated by low-temperature SCR component 18 is not permitted to remix with the engine exhaust until it reaches a location downstream from at least DOC component 20. Because DOC component 20 is bypassed, exhaust after-treatment system 16 only requires injector(s) 42 at a single location (i.e., upstream of low-temperature SCR component 18), and does not require injectors 42 downstream from DOC component 20 and upstream from second SCR component 24. Moreover, this configuration does not require an ASC component to be coupled with low-temperature SCR component 18, which enables low-temperature SCR component 18 to be enlarged while still maintaining a package size that is consistent with the close-coupled location of bypass passage 30. Further, the NOx that has been treated by low-temperature SCR component 18 to form $N_2$ cannot be re-oxidized by DOC component 20. In addition, while injector 42 is illustrated in FIG. 2 as being attached for injection of the exhaust treatment fluid into exhaust passage 14, it should be understood that injector(s) 42 can be coupled to inlet 32 of bypass passage 30, if desired.

Figure 3:
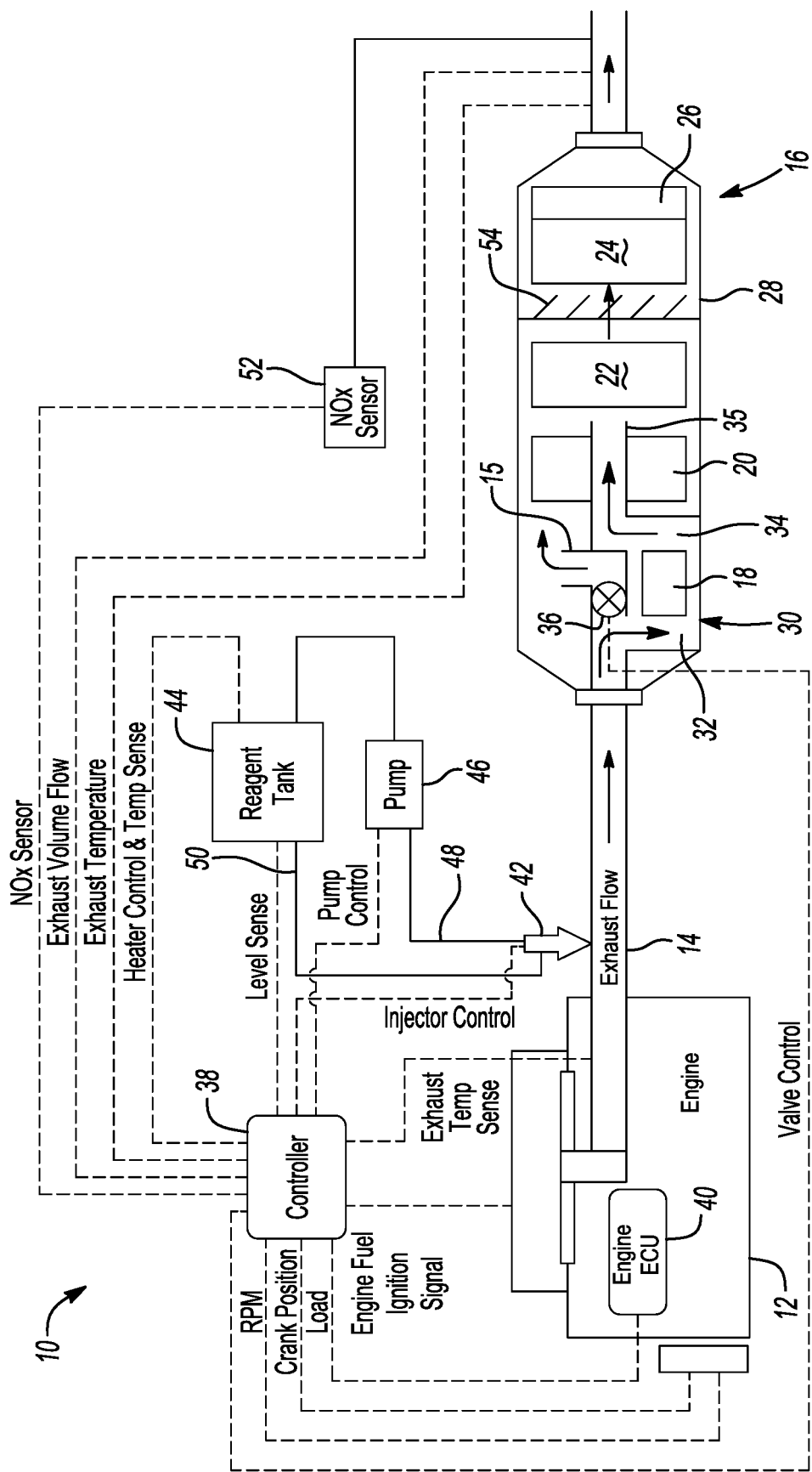
FIG. 3 is a schematic representation of an exhaust system according to a principle of the present disclosure.

Now referring to FIG. 3, an exhaust after-treatment system 16 according to a third aspect of the present disclosure is illustrated. Exhaust after-treatment system 16 is similar to those illustrated in FIGS. 1 and 2, but exhaust after-treatment system 16 is entirely contained within a single canister 28. With such a configuration, canister 28 may be closely-coupled to engine 12 so that nearly all of the exhaust enthalpy that exits the engine 12 can be utilized to obtain conditions that can ensure that the water of the exhaust treatment fluid can be readily evaporated and the urea properly decomposed to a sufficient extent.

In the illustrated configuration, the engine exhaust flows through exhaust passage 14 and enters canister 28. Upon entry into canister 28, at least a portion of the engine exhaust can be diverted into bypass passage 30, which is entirely located within canister 28, by valve 36. As noted above, however, it should be understood that at least a portion of the engine exhaust is always permitted to pass through valve 36 toward DOC component 20, which occurs through outlet 15. As the engine exhaust diverted by valve 36 enters inlet 32 of bypass passage 30, the engine exhaust will be treated by low-temperature SCR component 18 and enter outlet 34 of bypass passage 30. Outlet 34, however, does not permit the engine exhaust treated by low-temperature SCR component 18 to remix with the engine exhaust that has passed through valve 36 at a location upstream of DOC component 20. In contrast, outlet 34 includes length 35 that is designed to pass through a center of DOC component 20 and remix with the engine exhaust at a location downstream of DOC component 20. As illustrated, length 35 is greater than a length of DOC component 20 such that outlet 34 extends through an entirety of DOC component 20, and extends outward from DOC component 20. Alternatively, length 35 may be designed to pass through a center of each of DOC component 20 and DPF component 22.

Because DOC component 20 is bypassed, exhaust after-treatment system 16 only requires injector(s) 42 at a single location (i.e., upstream of low-temperature SCR component 18), and does not require injectors 42 downstream from DOC component 20 and upstream from second SCR component 24. Moreover, this configuration does not require an ASC component to be coupled with low-temperature SCR component 18, which enables low-temperature SCR component 18 to be enlarged while still maintaining a package size that is consistent with the close-coupled location of bypass passage 30. Further, the NOx that has been treated by low-temperature SCR component 18 to form $N_2$ cannot be re-oxidized by DOC component 20. In addition, while injector(s) 42 are illustrated in FIG. 3 as being attached to exhaust passage 14 for injection of the exhaust treatment fluid into the exhaust stream, it should be understood that injector(s) 42 can be coupled to an exterior of canister 28 at a location proximate bypass passage 30.

In light of the exhaust treatment fluid being dosed into the exhaust stream at a location upstream of low-temperature SCR component 18, it may be desirable to provide a mixing device 54 in canister 28 at location downstream of outlet 34 and upstream of second SCR component 24. Mixing device 54 assists in redistributing the ammonia before it enters and is treated by SCR component 24. Any mixing device 54 known to one skilled in the art may be used.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust after-treatment system that is configured to treat an exhaust produced by an engine, the system comprising:
    an exhaust passage for carrying the exhaust produced by the engine;
    a bypass passage including an inlet for receiving an amount of the exhaust from the exhaust passage;
    a first exhaust treatment component located within the bypass passage;
    a valve located proximate the bypass passage that is configured to control the amount of the exhaust that enters the inlet of the bypass passage; and
    a second exhaust treatment component located in the exhaust passage downstream from the inlet of the bypass passage,
    wherein an outlet of the bypass passage communicates the exhaust treated by the first exhaust treatment component back to the exhaust passage at a location that is downstream from the second exhaust treatment component, the exhaust treated by the first exhaust treatment component does not interact with the second exhaust treatment component wherein the outlet includes a length that is greater than a length of the second exhaust treatment component, and extends co-axially with the exhaust passage and through a center of and outward from the second exhaust treatment component.

2. The system according to claim 1, further comprising an injector configured to dose an exhaust treatment fluid into the exhaust passage, the injector only being located at a single location that is positioned upstream of the bypass passage.

3. The system according to claim 1, further comprising a third exhaust treatment component and a fourth exhaust treatment component in the exhaust passage and located downstream from the second exhaust treatment component.

4. The system according to claim 1, wherein the valve is passively controlled or actively controlled.

5. The system according to claim 4, further comprising a controller that is configured to actively control the valve.

6. An exhaust after-treatment system that is configured to treat an exhaust produced by an engine, the system comprising:
- an exhaust passage for carrying the exhaust produced by the engine;
- a bypass passage including an inlet for receiving an amount of the exhaust from the exhaust passage;
- a first exhaust treatment component located within the bypass passage;
- a valve located proximate the bypass passage that is configured to control the amount of the exhaust that enters the inlet of the bypass passage; and
- a second exhaust treatment component located in the exhaust passage downstream from the inlet of the bypass passage,
- wherein an outlet of the bypass communicates the exhaust treated by the first exhaust treatment component back to the exhaust passage at a location that is downstream from the second exhaust treatment component, the exhaust treated by the first exhaust treatment component does not interact with the second exhaust treatment component, the exhaust after-treatment system further comprising a canister in communication with the exhaust passage,
- wherein the canister houses an entirety of the bypass passage, the first exhaust treatment component located within the bypass passage, the valve located proximate the bypass passage, and the second exhaust treatment component located downstream from the inlet of the bypass passage.

7. The system according to claim 6, wherein the outlet includes a length that is greater than a length of the second exhaust treatment component, and extends co-axially with the exhaust passage and through a center of and outward from the second exhaust treatment component.

8. An exhaust after-treatment system that is configured to treat an exhaust produced by an engine, the system comprising:
- an exhaust passage for carrying the exhaust produced by the engine;
- a bypass passage including an inlet for receiving an amount of the exhaust from the exhaust passage;
- a first selective catalytic reduction (SCR) component located within the bypass passage;
- a valve located proximate the bypass passage that is configured to control the amount of the exhaust that enters the inlet of the bypass passage, and always permit an amount of the exhaust to pass through the valve downstream from the inlet of the bypass passage;
- an injector configured to dose an exhaust treatment fluid into the exhaust passage, the injector only being located at a single location that is positioned upstream of the bypass passage;
- an oxidation exhaust treatment component located in the exhaust passage downstream from the inlet of the bypass passage; and
- a second SCR component located downstream from the oxidation exhaust treatment component,
- wherein an outlet of the bypass passage communicates the exhaust treated by the first SCR component back to the exhaust passage at a location that is downstream from the oxidation exhaust treatment component and upstream from the second SCR component, wherein the exhaust treated by the first SCR component does not interact with the oxidation exhaust treatment component, wherein the outlet includes a length that is greater than a length of the oxidation exhaust treatment component, and extends co-axially with the exhaust passage and through a center of and outward from the oxidation exhaust treatment component.

9. The system according to claim 8, further comprising a particulate filter located downstream from the oxidation exhaust treatment component and upstream from the second SCR component, and a slip catalyst located downstream from the second SCR component.

10. The system according to claim 8, further comprising a controller that is configured to actively control the valve.

11. An exhaust after-treatment system that is configured to treat an exhaust produced by an engine, the system comprising:
- an exhaust passage for carrying the exhaust produced by the engine;
- a bypass passage including an inlet for receiving an amount of the exhaust from the exhaust passage;
- a first selective catalytic reduction (SCR) component located within the bypass passage;
- a valve located proximate the bypass passage that is configured to control the amount of the exhaust that enters the inlet of the bypass passage, and always permit an amount of the exhaust to pass through the valve downstream from the inlet of the bypass passage;
- an injector configured to dose an exhaust treatment fluid into the exhaust passage, the injector only being located at a single location that is positioned upstream of the bypass passage;
- an oxidation exhaust treatment component located in the exhaust passage downstream from the inlet of the bypass passage; and
- a second SCR component located downstream from the oxidation exhaust treatment component,
- wherein an outlet of the bypass passage communicates the exhaust treated by the first SCR component back to the exhaust passage at a location that is downstream from the oxidation exhaust treatment component and upstream from the second SCR component, wherein the exhaust treated by the first SCR component does not interact with the oxidation exhaust treatment component, the exhaust after-treatment system further comprising a canister in communication with the exhaust passage,
- wherein the canister houses an entirety of the bypass passage, the first SCR component located within the bypass passage, the valve located proximate the bypass passage, and the oxidation exhaust treatment component located downstream from the inlet of the bypass passage.

12. The system according to claim 11, wherein the outlet includes a length that is greater than a length of the oxidation exhaust treatment component, and extends co-axially with the exhaust passage and through a center of and outward from the oxidation exhaust treatment component.

13. An exhaust after-treatment system that is configured to treat an exhaust produced by an engine, the system comprising:
- an exhaust passage for carrying the exhaust produced by the engine;
- a canister in communication with the exhaust passage;
- a bypass passage entirely provided in the canister, the bypass passage including an inlet for receiving an amount of the exhaust that enters the canister from the exhaust passage;
- a first selective catalytic reduction (SCR) component located within the bypass passage;

a valve located in the canister proximate the bypass passage that is configured to control the amount of the exhaust that enters the inlet of the bypass passage, and always permit an amount of the exhaust to pass through the valve downstream from the inlet of the bypass passage;

an injector configured to dose an exhaust treatment fluid into the exhaust passage at a single location that is positioned upstream of the canister;

an oxidation exhaust treatment component located in the canister downstream from the inlet of the bypass passage; and a second SCR component located in the canister downstream from the oxidation exhaust treatment component, wherein an outlet of the bypass passage communicates the exhaust treated by the first SCR component back to a location in the canister that is downstream from the oxidation exhaust treatment component and upstream from the second SCR component, wherein the exhaust treated by the first SCR component does not interact with the oxidation exhaust treatment component.

* * * * *